US011788309B2

(12) United States Patent
Klimaschewski

(10) Patent No.: US 11,788,309 B2
(45) Date of Patent: Oct. 17, 2023

(54) SURFING INSTALLATION

(71) Applicant: GoodSurface Wave, LLC, Denver, CO (US)

(72) Inventor: Rainer Klimaschewski, Martinsried (DE)

(73) Assignee: GoodSurf Wave, LLC, Denver, CO (US)

( * ) Notice: Subject to any disclaimer, the term of this patent is extended or adjusted under 35 U.S.C. 154(b) by 258 days.

(21) Appl. No.: 16/768,841

(22) PCT Filed: Dec. 3, 2018

(86) PCT No.: PCT/EP2018/083331
§ 371 (c)(1),
(2) Date: Jun. 1, 2020

(87) PCT Pub. No.: WO2019/110496
PCT Pub. Date: Jun. 13, 2019

(65) Prior Publication Data
US 2021/0146213 A1 May 20, 2021

(30) Foreign Application Priority Data

Dec. 5, 2017 (EP) ............................... 20170205359

(51) Int. Cl.
*E04H 4/00* (2006.01)
*A63B 69/00* (2006.01)
(52) U.S. Cl.
CPC ....... *E04H 4/0006* (2013.01); *A63B 69/0093* (2013.01); *A63B 2208/03* (2013.01); *A63B 2225/093* (2013.01)
(58) Field of Classification Search
CPC ............ E04H 4/0006; A63B 69/12–14; A63B 69/0093; B63B 32/00–87
See application file for complete search history.

(56) References Cited

U.S. PATENT DOCUMENTS 5,401,117 A * 3/1995 Lochtefeld ......... A63B 69/0093
4/491
8,516,624 B2 * 8/2013 Klimaschewski .... E04H 4/0006
4/491
(Continued)

FOREIGN PATENT DOCUMENTS

EP 2356298 A1 8/2011
FR 2906287 * 3/2008 ........... A63B 69/125
(Continued)

*Primary Examiner* — David P Angwin
*Assistant Examiner* — Nicholas A Ros
(74) *Attorney, Agent, or Firm* — Erise IP, P.A.

(57) ABSTRACT

The invention relates to a surfing installation (10, 10A, 10B) for generating a surfable wave (60), comprising an inclined ramp (50) to the upper end (51) of which water flows via a water inlet (46), which water is accelerated on the ramp (50) to a first flow speed, the lower end (52) of the ramp (50) leading into a region (30) having a lower second flow speed relative to the first flow speed, and a standing wave, in the flow direction, forming in the region (30) as a result of the water flowing at the first, faster flow speed striking the water flowing at the second, lower flow speed. A further functional area for the surfing installation (10) for one or more surfers (80) is achieved, according to the invention, in that at least two walls (506, 508) that define at least one flow channel (504) are arranged in the region of the water inlet (46) and/or of the ramp (50), which walls are movable in rotation and/or in translation, transversely to the flow direction of the water, by means of at least one drive (5046), in order to generate at least one traveling wave (60) that travels transversely to the flow direction.

15 Claims, 9 Drawing Sheets

(56) References Cited

U.S. PATENT DOCUMENTS

| | | | |
|---|---|---|---|
| 8,882,604 B2* | 11/2014 | Lochtefeld | A63G 31/007 |
| | | | 472/117 |
| 9,457,290 B2* | 10/2016 | Hill | A63H 33/42 |
| 9,534,408 B2* | 1/2017 | Osterman | E04H 4/0006 |
| 9,920,544 B1* | 3/2018 | Bennett | E04H 4/0006 |
| 10,364,584 B2* | 7/2019 | Odriozola Sagastume | |
| | | | A63B 69/0093 |
| 2003/0180095 A1 | 9/2003 | McFarland | |
| 2013/0074254 A1* | 3/2013 | Payne | E04H 4/0006 |
| | | | 4/491 |

FOREIGN PATENT DOCUMENTS

| | | | | |
|---|---|---|---|---|
| JP | H05346070 | * | 12/1993 | A63B 69/0093 |
| WO | 2013078443 A1 | | 5/2013 | |
| WO | 2015188219 A1 | | 12/2015 | |

* cited by examiner

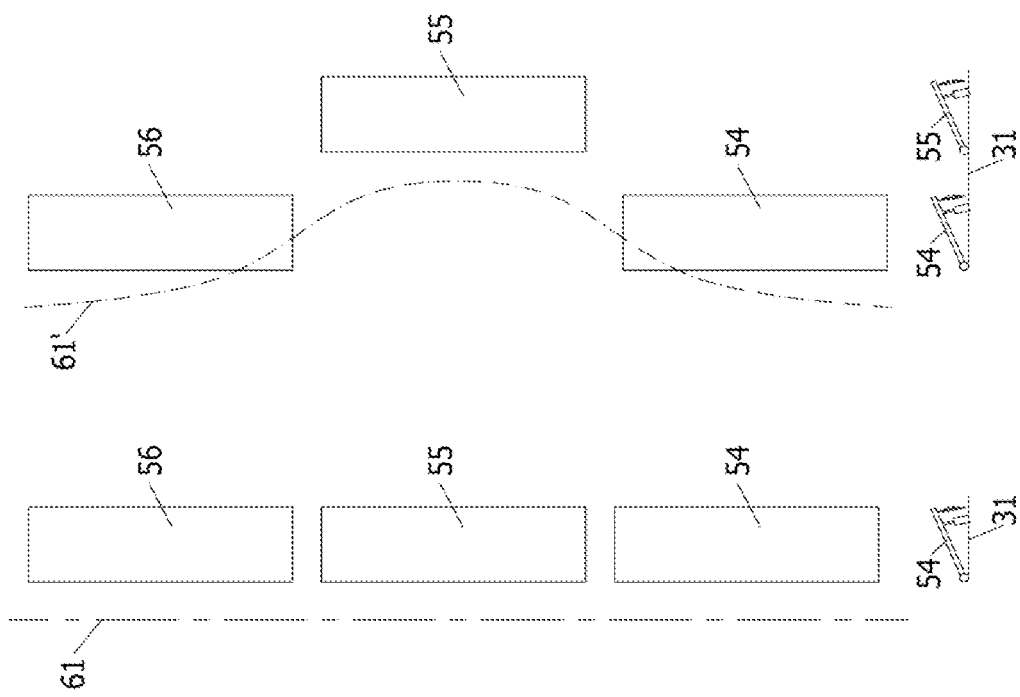
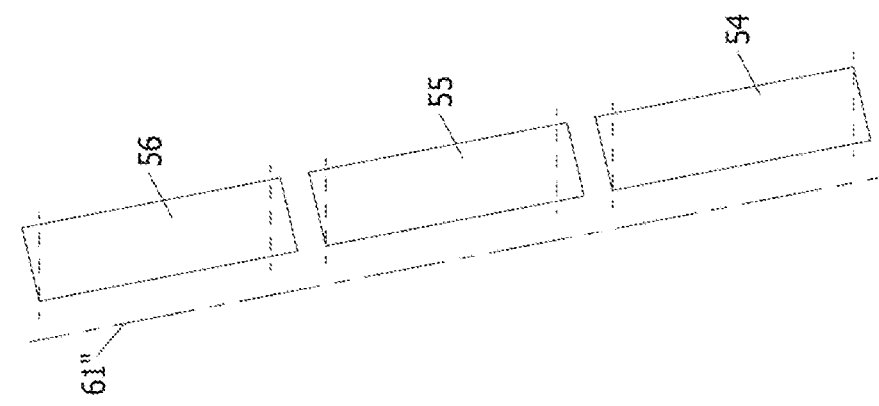
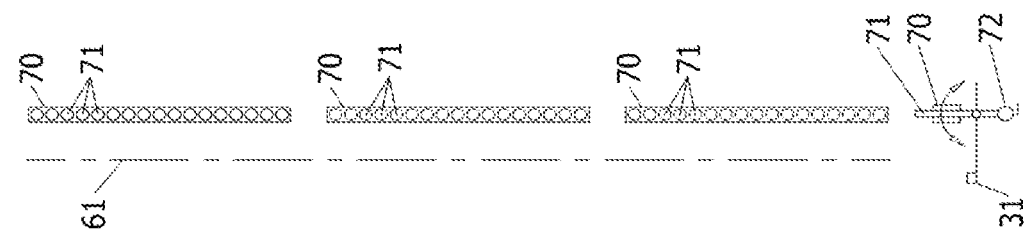

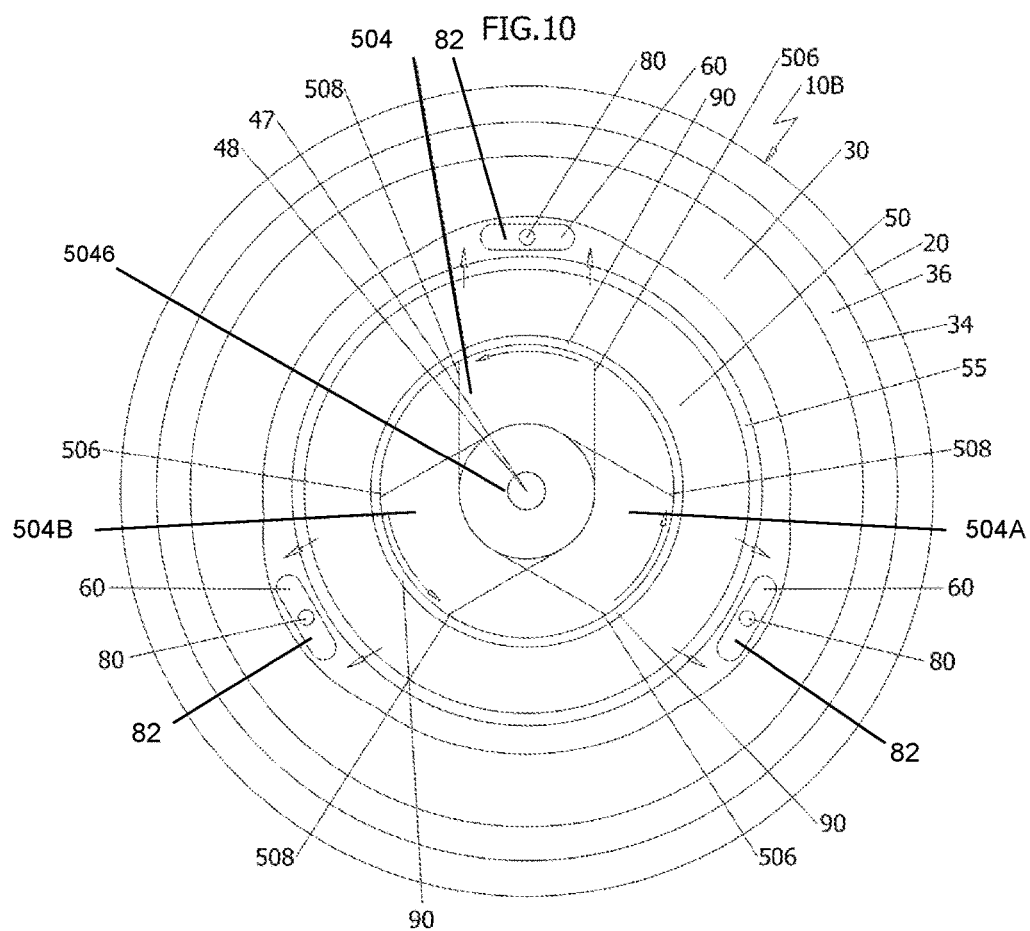
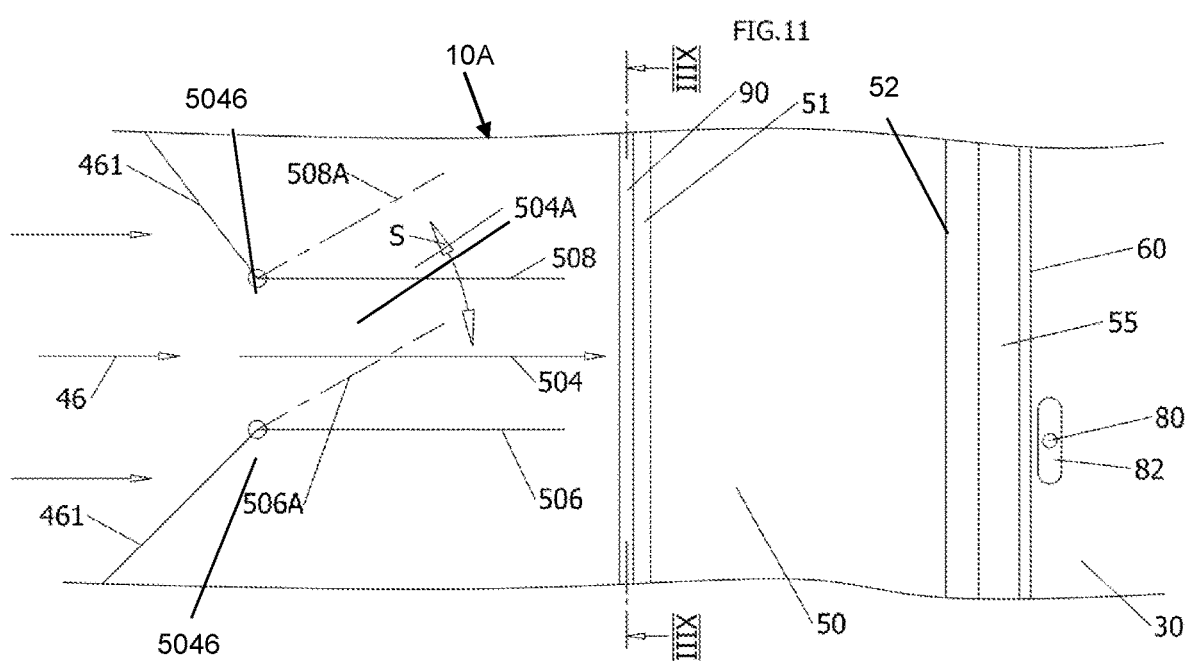

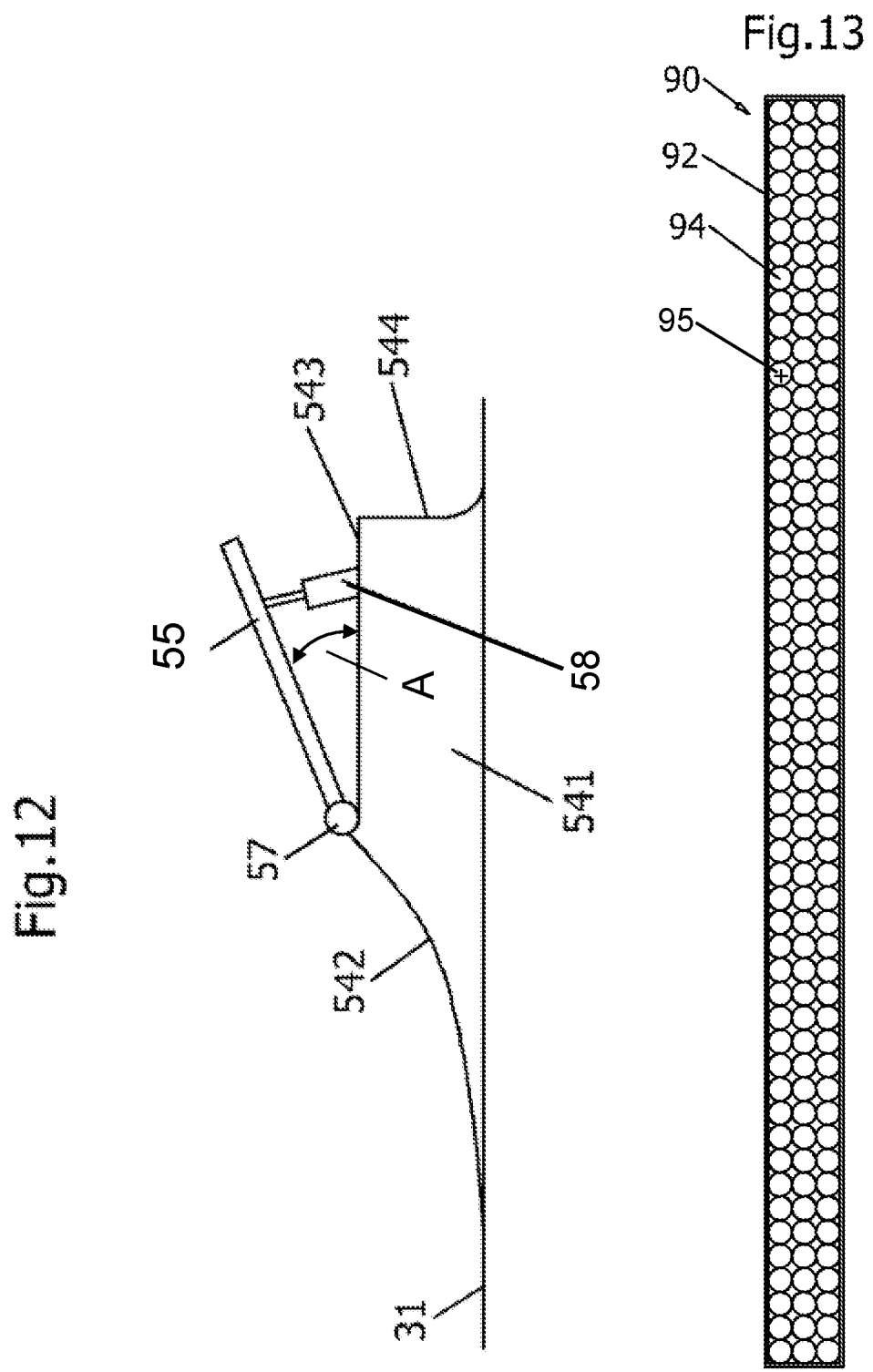
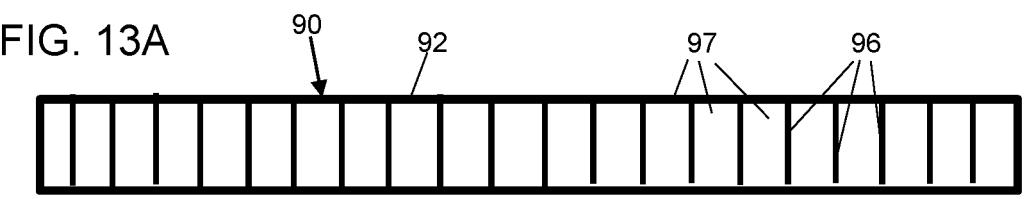

SURFING INSTALLATION

The invention relates to a surfing installation for portable or fixed use, according to the preamble of claim 1.

A surfing installation of the type in question is known from EP 2 356 298 B1, which can be traced back to the same applicant. In this known surfing installation, the water flows down a ramp and, at the bottom, strikes a standing or more slowly flowing mass of water. The resistance thereof results in the development of what is known as a "standing wave" in the water flowing down the ramp. In this case, a rectangular wave pool also allows for lateral surfing, transversely to the flow direction, but which is limited by the relatively narrow width of the wave pool.

The object of the invention is that of providing a surfing installation by means of which even better use can be made of a standing wave.

This object is achieved by a surfing installation having the features of claim 1. Advantageous embodiments of the invention are specified in the dependent claims.

According to the invention, a moving or traveling "standing" wave is generated in that at least two walls that are arranged before and/or after a ramp or a weir region, so as to be substantially in parallel with the flow direction of the water, and that define at least one flow channel, are movable, by means of at least one drive, transversely to the flow direction of the water flowing down the ramp, and thus generate a moving standing wave in the wave pool, which wave travels transversely to the flow direction, upon striking the standing or more slowly flowing mass of water. The surfer can thus follow the wave that is traveling in the wave pool, transversely to the ramp.

Since the flow channel is of only a limited width, the energy input required for generating the wave is still no greater, but instead rather less, than in the case of the surfing installation mentioned at the outset. The surfing installation according to the invention thus links as low as possible an energy input and the greatest possible benefit for one or more surfer(s). Irrespective of a reduction in the energy input, a further advantage is a significantly longer surfing distance without turning maneuvers.

The term "standing wave" means a wave that is stable when viewed in the flow direction of the water, which wave, however, according to the invention, additionally moves further in the wave pool or in a riverbed, as a "traveling wave," transversely to the flow direction, and thus allows one or more surfer(s) to surf one wave even over a longer distance, without having to constantly make turning movements. A river, a lake or a marine region can also be used instead of a main pool surrounding the wave pool.

If the term "movable on the ramp, transversely to the flow direction" is used in this application, in connection with the movement of the walls that define the at least one flow channel, this covers not only movements that occur exactly at a right-angle to the fall line of the ramp, but rather all movements that comprise a component transversely to the ramp. The walls of the at least one flow channel can therefore also be arranged obliquely to the fall line of the ramp.

If a "ramp" is mentioned in this application, this means both a downwardly sloping surface, downstream of the pumping system in terms of flow, in an artificial surfing installation, and a downwardly sloping region of a riverbed, for example in the region of a weir in a naturally flowing body of water. A ramp can also be formed as an inclined surface or platform that comprises side walls and that floats or is securely anchored in a body of water.

In an alternative embodiment, a wave pool of an artificial surfing installation is designed in the form of a circular sector having an inscribed angle (central angle) of between 10° and 360°. In this embodiment, the walls that define the flow channel preferably perform a pivoting movement about the center of the circle.

The movement of the walls defining the flow channel can take place as an alternating reciprocating pivoting movement or, in the case of a wave pool that forms a full circle having an inscribed angle of 360°, also as a continuous rotational movement in just one direction.

However, in all the embodiments according to the invention, the movement can likewise take place in the form of a translational movement or as a superimposed rotational/translational movement of the flow channel, transversely to the normal flow direction of the water.

According to an advantageous development, in the case of a surfing installation comprising a wave pool in the form of a circular sector the water inlet is arranged in the region of the center of the circular sector. As a result, the same amount of water is always conducted through the flow channel, irrespective of the current position of the flow channel. In this case, the amount of water delivered depends exclusively on the capacity and the number of the connected pumps.

According to an alternative embodiment, the at least one flow direction can also be formed by a tube or shaft that is movable transversely to the flow direction in a rotational, translational or superimposed rotational/translational manner, the walls of which then form the walls defining the flow channel, within the meaning of the main claim.

According to an advantageous embodiment of the invention, the walls defining a flow channel are connected to the drive by means of a link, and are guided substantially in parallel during a pivoting movement of the flow channel. The speed of pivoting movement can preferably be changed by the drive, as a result of which the requirements can be adjusted to the surfer active in the wave pool in each case.

It is particularly advantageous for the pumping system for metering the discharge of the water in the water inlet to comprise one or more pumping units, the delivery rate of which can be changed and/or which can be connected individually or in groups. As a result, the amount of water, and thus, in conjunction with a change in the width of the flow channel which is optionally additionally possible, also the height and the speed of the current of water flowing down the ramp, can be changed, as a result of which the height of the traveling wave in the wave pool is also influenced. As a result, the performance level of the surfer in the wave pool in each case, can be taken into account. As a result, the surfing installation according to the invention can always generate a suitable wave, for beginners right up to professional surfers.

The ramp, in the form of a planar or—in the case of a circular or semicircular wave pool—frustoconical slanted plane is connected, at the upper end thereof, to a flow portion that homogenizes the flow, and is preferably mounted, at the lower end thereof, in a wave pool. The wave pool can alternatively also be formed by a river, a lake or a marine region.

However, in the surfing installation according to the invention the shape and height of the standing wave is preferably also influenced by the fact that the water flowing down the ramp at a first flow speed is guided over at least one adjustable guide device that is arranged so as to be spaced apart from the lower end of the ramp, in the flow direction. The guide device can be designed as a fixed assembly, as an assembly that is adjustable with respect to the position and orientation thereof, as an assembly that can be completely sunk, or as a component that is movable along a guideway, the guidance then preferably occurring on a path concentric to the center of the circular sector, in the case of a wave pool that is circular or that is in the shape of a circular sector. The guide device can be arranged as a pivotable floater, directly on the base of the wave pool, or preferably on a pedestal that is raised relative to the base of the wave pool.

The water level in the wave pool can preferably be set using an adjustable device for drainage regulation. In addition to the second slower flow speed that the water flowing down the ramp at the first, higher speed strikes, said drainage regulation also influences a return flow that flows back to the wave, on the rear face of the wave at the base of the wave pool, and thus also influences the formation of the wave. The adjustable device for drainage regulation is preferably designed such that the water can be let out of the wave pool or forced back therein in a metered manner, in different planes that are arranged one above the other and/or side-by-side. As a result, the return flow acting on the rear face of the surfable wave can be purposefully influenced and adjusted by means of purposeful adjustment of the surface current and undercurrent.

It is advantageous for a plurality of pumping units, arranged side-by-side, to be arranged upstream of the water inlet, which is also referred to as the flow portion. The flow portion is a relatively large reservoir that homogenizes the amount of water delivered by the different pumping units. As a result, in the case of a lower water requirement for generating a lower wave that is also suitable for beginner surfers, it is possible, for example, for the delivery rate of individual pumps to also be throttled or shut off completely, without this resulting in a different layer thickness of the current of water over the width of the ramp.

Preferably, each of the plurality of pumping units is provided with one pump, respectively, which pump suctions water from the main pool or from the natural body of water surrounding the surfing installation, and delivers said water to the water inlet (flow portion) upstream of the ramp. In this case, in order to regulate the overall amount of water delivered to the water inlet (flow portion), the delivery rate of the pumps can preferably be regulated and/or the plurality of pumps can be connected and shut off individually or in groups.

The side walls of the flow portion are preferably adjustably mounted, for the purpose of changing the width and/or the angle of the water supply to the flow channel. This additionally results in further options for influencing the standing wave, for the purpose of regulating the water discharge. It is thus also possible to adjust the height of said wave for different performance levels of the surfers.

In a mobile surfing installation having a limited circulating amount of water, it is particularly advantageous for the wave pool, the pump chambers, and the collection chamber to be surrounded by a main pool. Separating the higher wave pool from the main pool furthermore guarantees that only a defined mass of water, specifically that located in the wave pool, forms the resistance for the water flowing down from the ramp. This makes the formation of a standing wave substantially more calculable and more clearly reproducible.

In this case, the separation between the wave pool and the main pool can preferably be regulated by means of the device for drainage regulation. Said device can preferably change both the water storage level in the wave pool and the degree of permeability, for example by means of two grate apertures or aperture plates that are mounted so as to be displaceable relative to one another, or by means of a plurality of flaps that are arranged one above the other and/or side-by-side and can be controlled with respect to the opening width thereof. As a result, the flow speed of the water in the wave pool and the resistance that opposes the water flowing down from the ramp can be adjusted as essential parameters for the form of the shape and size of a standing wave.

According to a first embodiment, the guide device is formed by at least one guide profile that can preferably be adjusted not only with regard to the angle of incidence thereof with respect to the flow, but also with regard to the spacing thereof from the lower end of the ramp. It can optionally also be possible for the length of the guide profile to be changed by means of parts that are telescopically displaceable relative to one another. Alternatively or in addition to the guide profiles, the guide devices can also be formed of at least one nozzle strip that is provided with at least one nozzle on which water, delivered under pressure, can act means of at least one pump.

According to an alternative embodiment, the guide profile is divided into a plurality of mutually adjacent guide profiles, over the width of the wave pool. In this case, in order to influence the wave shape of the wave the plurality of mutually adjacent guide profiles can be arranged over the length and/or over the width of the wave pool so as to be at different positions, transversely or obliquely to the flow. This arrangement at different positions is facilitated in that a plurality of retainers or guideways are provided on the base of the wave pool, for the purpose of fastening or preferably for displaceable mounting of the guide profiles.

The guide profiles are pivotably mounted in the region of the front edges thereof, and the rear edge thereof is adjustable by means of adjustment mechanics. The adjustment mechanics can be formed for example by a pneumatic cylinder. The pivot bearing in the region of the front edges of the guide profiles is particularly preferably arranged on a pedestal that rises up from the base of the wave pool.

In a variant, the guide profiles are mounted so as to be freely floating at least in a portion of the pivot region thereof. In this case, a first fold-out movement of the rear edge is achieved using adjustment mechanics, and the remaining part of the fold-out movement occurs automatically owing to the vacuum, caused by the flow, on the upper face of the guide profile. In this case, a boundary, for example in the form of a preferably adjustable band that is arranged between the rear edge of the guide profile and the base of the wave pool, can expediently limit the maximum fold-out angle, such that sudden stalling of the flow and collapse of the wave does not occur. In contrast to the relatively large wave-forming bodies arranged close to the water surface in other known surfing installations (see for example U.S. Pat. No. 6,629,803 B1), the rear end of the guide profile is not located in the region of the standing wave used by the surfers, but instead in a region of the wave pool that is relatively close to the base, under a wave having a significant water layer thickness, such that fall-related injuries cannot be caused by said component.

In a preferred variant, the guide devices (guide profiles, nozzle strips, pedestal) can preferably be lowered completely into the base of the wave pool, using a hydraulic drive, such that the wave pool can then also be used as a swimming pool, having a completely flat base.

A further possibility for adjusting the wave can be achieved by the height of an upper bearing in the region of the upper end of the ramp, together with the flow portion, being adjustable by means of adjustment mechanics.

Finally, further advantageous influencing of the wave is made possible by means of the water level in the wave pool and the outflow quantity of the water out of the wave pool being able to be regulated, at the rear wall thereof that is downstream of the lower end of the ramp, by means of the device for drainage regulation that can be adjusted by adjustment mechanics, from which rear wall the water flows back into the main pool or into the natural body of water surrounding the surfing installation. The return current eddy on the rear face, caused by said backwater, also makes it easier for a surfer who has fallen off the surfboard to stand up in the region of the wave pool downstream of the wave and to climb out of the wave pool.

An equalizer that consists of a plurality of tubular hollow bodies that are preferably arranged flush side-by-side is preferably arranged upstream of the upper edge of the ramp, the longitudinal axes of which bodies are arranged so as to be substantially perpendicular to the lower end of the ramp. The equalizer causes the water flowing through the flow channel and onto the ramp to be oriented again, irrespective of the particular pivot angle of the flow channel, so as to flow onto the guide profiles (floaters) arranged transversely in the wave pool in a manner substantially perpendicular thereto. The equalizer additionally achieves eddies and thus additionally enriches the water with air bubbles that ensure greater volume and softer water in the surfable wave. An equalizer of this kind can also be used, in a manner that is advantageous per se, in other known surfing installations, as an additional component.

According to a further development of the invention that is also advantageous per se, at least one flow divider that is displaceable transversely to the flow direction can be arranged in the wave pool and/or in the region of the ramp. In this case, the at least one flow divider is not only displaceably mounted in the wave pool, but rather can optionally also be used in different positions in the wave pool, and can also be removed therefrom entirely. The wave pool can be divided into one or more portions, and can thus be adjusted to different requirements, using said flow divider or said flow dividers. In the case of a flow divider that is entirely pushed to the side, the entire width of the wave pool is available. If the flow divider is pushed into an intermediate position, in which it divides the wave pool into two portions of the same or different sizes, the rotational, translational or superimposed rotational/translational movement of the flow channel can cover only one portion, and therefore in the case of a low level of operation on the surfing installation at a low delivery rate, partial operation in one of the portions is still possible. It is also possible for different amounts of water and different speeds to act on the different portions, by means of a plurality of flow channels. It is thus possible, for example, for a first region of the wave pool that is divided off by the flow divider and has surfable waves of a lower height to be made available to surfing beginners, while another second region of the wave pool having a higher surfable wave can be made available to advanced surfers.

Embodiments of the surfing installation according to the invention will be explained in greater detail in the following, with reference to the drawings.

In the drawings:

FIG. 4 shows a first arrangement of a plurality of guide devices oriented on a line transversely to the flow;

FIG. 5 shows a second arrangement of a plurality of guide devices oriented transversely to the flow and so as to be mutually offset;

FIG. 6 shows a third arrangement of a plurality of guide devices oriented obliquely to the flow;

FIG. 7 shows a variant in which the guide devices are formed by nozzles or by nozzle strips;

FIG. 10 is a plan view of an alternative to FIG. 9, comprising a circular wave pool and three pairs of movable walls that are mutually offset by 120° and define three flow channels;

FIG. 11 is a schematic view of a device according to the invention when used in a natural river course;

FIG. 12 is a side view of a guide profile (floater) arranged on a pedestal having a rising front flank;

FIG. 13 is a longitudinal section through an equalizer that orients the flow of the water, according to the cutting line XIII-XIII in FIG. 3;

FIG. 13A is a longitudinal section through an equalizer which, instead of flow conducting hollow bodies, comprises channels delimited by flow-conducting partition walls;

Figure 1:
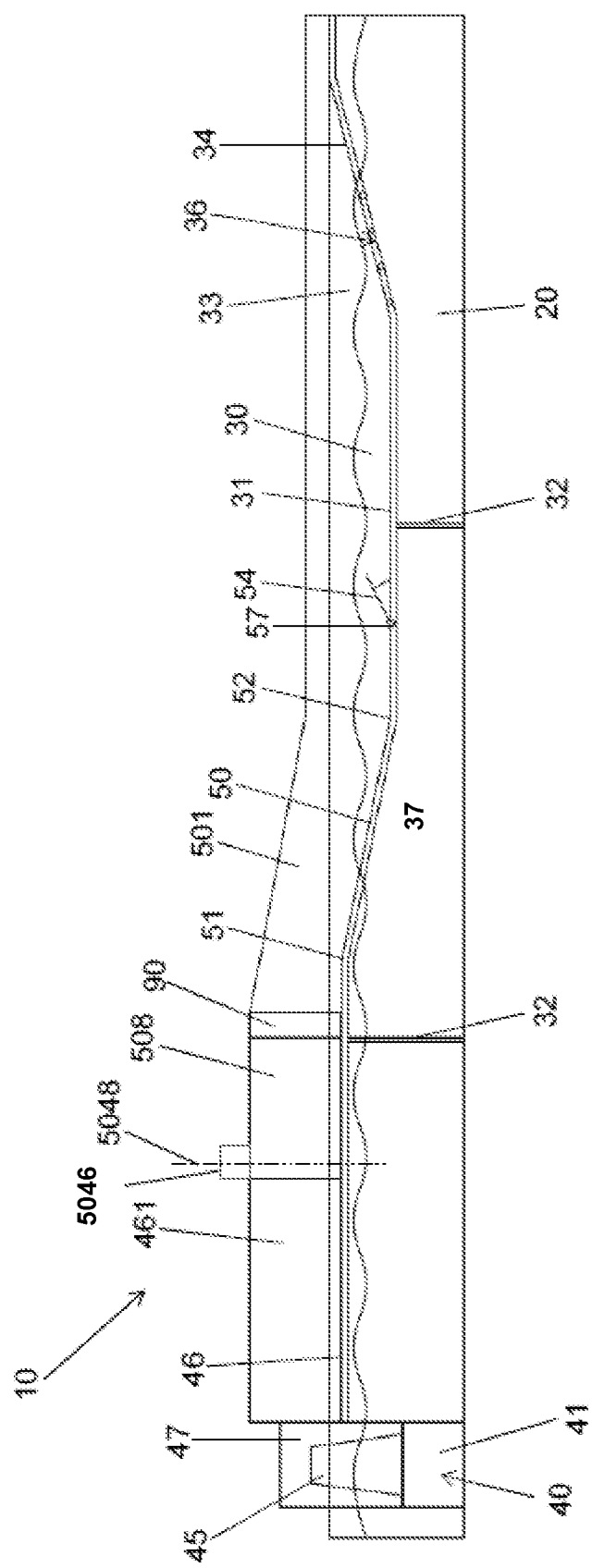
FIG. 1 is a schematic longitudinal section through the surfing installation, when the pumps are shut off.
Figure 2:
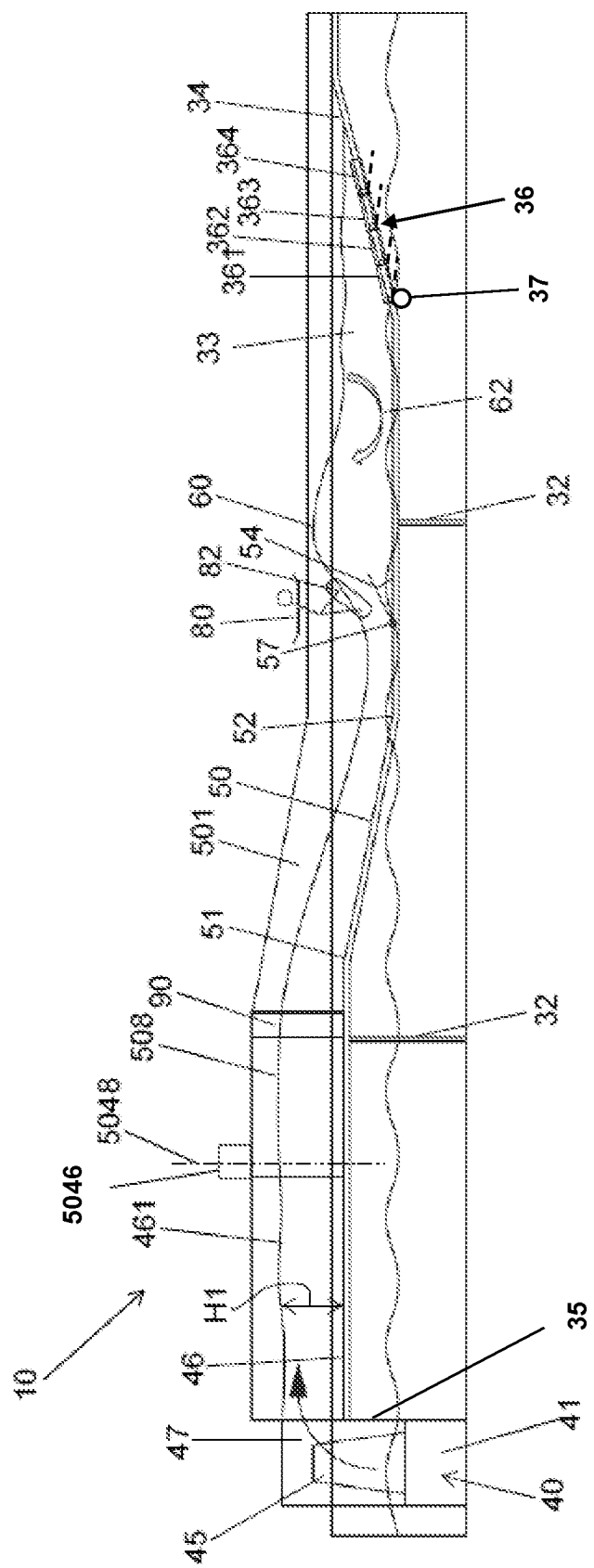
FIG. 2 is a schematic longitudinal section through the surfing installation, when the pumps are activated.

The drawings in the figures are purely schematic and should in no way be considered as being to scale. The surfing installation 10 shown in the drawings is formed by a tub-shaped main pool 20 that accommodates all the remaining components and retains the water, required for operation of the surfing installation 10, in a closed circuit. Inside the main pool 20, a wave pool 30 is arranged on supports 32 so as to be raised with respect to the base of said main pool. In a manner deviating therefrom, in the embodiment shown in FIG. 11 the wave pool 30 and the main pool 20 are formed by a riverbed. In the event of use in a natural body of water, such as a lake or a marine region, the wave pool 30 and main pool 20 can also be formed by said natural body of water.

Apart from the left-hand part of the main pool 20 shown in FIGS. 1 to 3A, the wave pool 30 extends over a large part of the length and width of said main pool. However, owing to the base 31 that is raised relative to the main pool 20, said wave pool is of a small depth. The mass of water located in the wave pool 30 is also correspondingly smaller than the total mass of water of the surfing installation 10.

The wave pool 30 is delimited on both sides by two side walls 33, on the right-hand end face by a rear wall 34, and on the left-hand end face by a front wall 35. A device for drainage regulation 36 is arranged in the rear wall 34, via which device water can flow out of the wave pool 30 and back into the main pool 20 (see FIG. 2).

The device for drainage regulation 36 is for example formed by a plurality of flaps 361, 362, 363, 364 that are arranged one above the other and/or optionally also side-by-side, can be pivoted open to a greater or lesser extent or can be completely closed, and that can preferably be adjusted separately from one another by means of at least one adjustment mechanics 37.

Instead of the flaps 361, 362, 363, 364, it is also possible for gratings to be provided, which gratings are displaceable relative to one another and comprise through-openings that can be released or closed to a greater or lesser extent. A further alternative of the device for drainage regulation 36 is a wall part, the height of which can be adjusted, relative to the rear wall 34, by means of adjustment mechanics 37, such that the height of the water level in the wave pool 30, and thus also the overall mass of water present in the wave pool 30, can be changed.

For safety reasons, a relatively fine-meshed screen or grating is arranged on the inside of the device for drainage regulation 36, facing the wave pool 30, in order to ensure that only water flows from the wave pool 30 back into the main pool 20, and that no people, carried along by the flow in the wave pool 30 owing to a fall, or objects lost by said people, could be dragged into the main pool 20 and thus into the intake region of the pumping systems 41.

Figure 3:
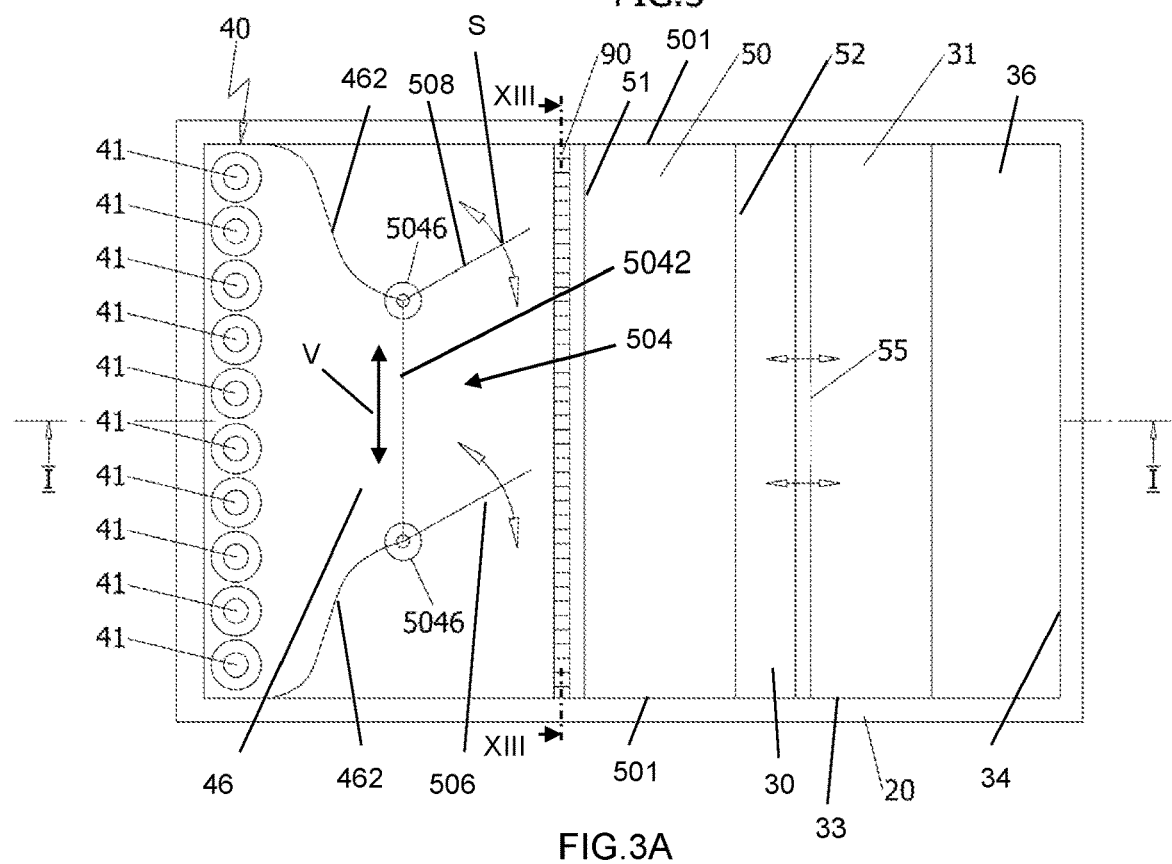
FIG. 3 is a schematic plan view of the surfing installation.
Figure 3A:
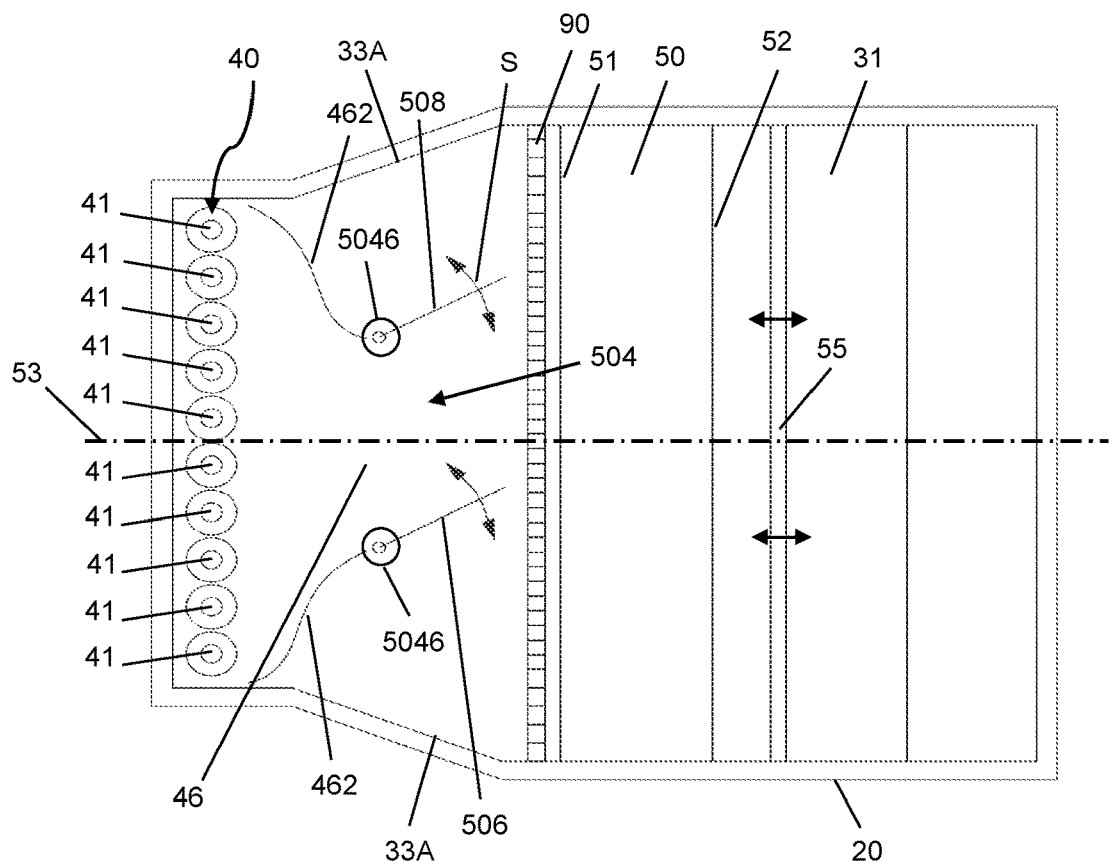
FIG. 3A is a schematic plan view of a surfing installation comprising a wave pool that widens relative to the water inlet.

A pumping system 40, denoted overall by 40, is arranged in the left-hand part of the main pool 20 in FIGS. 1 to 3A, into which region the wave pool 30 does not extend, owing to the limitation thereof by the front wall 35, which pumping system is made up, in the embodiment, of a plurality of pumping units 41 that are arranged side-by-side in the transverse direction (see FIGS. 3 and 3A). A high-capacity volumetric delivery pump 45 is arranged in each of the pumping units 41, which pump suctions water from the base region of the main pool 20 and pushes said water upwards. The pumping units 41 are connected, via at least one outlet opening 47, to a preferably horizontal water inlet 46 which is also referred to as the flow portion and on which the water delivered by the pump 45 is homogenized and subsequently accelerated by side walls 462 that narrow in the flow direction. The side walls 462 may be designed so as to be straight, or, as shown in FIGS. 3 and 3A, curved. The side walls 462 may consist of a rigid or a resiliently bendable material, and can also comprise a plurality of wall parts that can be displaced telescopically against or into one another.

In the second part of the flow portion 46, at least one flow channel 504 is provided, which channel adjoins the side walls 462, in the flow direction, and is delimited by at least two preferably mutually parallel walls 506 and 508. The walls 506, 508 of the flow channel 504 can be pivoted back and forth, continuously or in adjustable intervals, and preferably in a synchronous and rotational manner, by means of at least one drive 5046, as indicated by the double arrow S (see FIG. 3, 3A, and 11).

Instead of a rotational pivoting movement, the walls 506, 508 can alternatively also perform a translational movement transversely to the flow direction of the water, or, according to a further alternative, a superimposed rotational-translational movement. It is essential to the invention that the water stream delivered by the pumps 45 should be narrowed by the at least one flow channel 504 and moved in rotation and/or translation, back and forth or rotationally, on a circular path, in order to generate a traveling wave 60 transversely to the flow direction of the water.

A further extremely advantageous detail of the invention, which can also advantageously be implemented separately in other surfing installations, relates to an equalizer 90 that adjoins the movable flow channel 504 in the flow direction. The equalizer 90, which is formed of a plurality of hollow bodies 94 that are preferably arranged side-by-side and so as to be flush, is arranged upstream of the top end 51 of the ramp 50, such that the longitudinal axes 95 of the hollow bodies 94 are arranged perpendicularly to the guide profiles (floaters) 55 arranged in the wave pool 30. As a result, the equalizer 90 causes the water flowing through the flow channel 504 from the ramp 50 to be oriented again, irrespective of the particular pivot angle of the flow channel 504, so as to flow onto the floaters 54, 55 or 56 arranged transversely in the wave pool 30 in a manner substantially perpendicular thereto.

The hollow bodies 94 are preferably designed as tube sections having a round cross section, which are surrounded by a common frame 92 that surrounds the hollow bodies 94 (see FIG. 13). The hollow bodies 94 can, however, also be formed in different cross sectional shapes, such as square, rectangular, triangular, hexagonal, octagonal or oval. In this case, the intermediate spaces formed between the hollow bodies 94 preferably also function as flow channels of the equalizer 90 that are arranged in parallel with the longitudinal axes 95.

For example, in the case of a width of the wave pool 30 of 18 m, the equalizer may be formed by a bundle of tubes 94 that each have a diameter of approximately 100 to 150 mm. The tubes 94 are arranged inside the frame 92 surrounding them so as to be stacked, for example in six to eight layers. In the flow direction, the length of the tubes 94 is advantageously between 200 mm and 500 mm, in particular approximately 300 mm.

In the case of the wave pool 30 shown in FIGS. 1 to 3A having a width of 18 m, the side walls 461 preferably narrow the flow portion 46 that adjoins the pumping system 40 in the flow direction, such that the width of the flow channel 504 is approximately one third of the total width, i.e. approximately 6 m.

The equalizer 90 can advantageously be used, in an advantageous manner, in all the surfing installations 10 shown in the various figures, and furthermore also in already known surfing installations. In the case of a circular wave pool 30 or a wave pool 30 in the shape of a circular sector, the equalizer 90 is adjusted to the curvature thereof or is composed of a plurality of segments that are joined together in a polygonal manner.

At the side thereof facing the wave pool 30, the flow portion 46 adjoins the upper end 51 of a ramp 50 that descends obliquely towards the wave pool 30. The lower end 52 of the ramp 50 plunges directly into the wave pool 30 via the base 31. The lower end 52 of the ramp 50 is thus in the water of the wave pool 30. A fixed arrangement of the ramp 50 is preferred. However, according to a variant, said ramp can also be adjustable with respect to the gradient thereof.

In the variant shown in FIG. 3A, the wave pool 30 and preferably also the main pool 20 comprise a widening proceeding from the pumping system 40, owing to oblique side walls 33A.

At least one adjustable guide device is arranged at a spacing from the lower end 52 of the ramp 50, in the flow direction. According to a first embodiment, the guide device is formed by a guide profile 55 that is integral over the entire width thereof and that is arranged on the base 31 of the wave pool 30 or, according to FIG. 12, on a planar upper face 543 of a pedestal 541 raised relative to the base 31, such that the pivot angle thereof relative to the flow can be changed by means of adjustment mechanics 58. Proceeding from the base 31 of the wave pool 30, the pedestal 541 comprises a rising front flank 542 and a falling rear flank 544.

According to FIG. 12, the adjustment mechanics 58 is designed in the form of a pneumatic cylinder that is arranged between a bearing on the upper face 543 of the pedestal 541, or, in the absence of a pedestal 541, close to the base 31 of the wave pool 30, and a linkage close to the rear edge, on the lower face of the guide profile 55. However, other units, such as an electric stepper motor that is coupled to a gearing or a toothed rack, can also be used as adjustment mechanics 58. In a simple variant, the adjustment of the guide profiles 55 can also be achieved manually, in the idle state, when the pumps 45 are shut off (according to FIG. 1).

The guide profile 55 can be mounted so as to float freely in the flow, at least in a portion of the pivot region thereof, and/or such that the angle A (FIG. 12) thereof can be mechanically adjusted relative to the flow. In the case of the rear edge of the guide profile 55 being arranged so as to be freely floating at least in the end region, the maximum fold-out angle A of said guide profile is for example limited by a band (not shown) that is fastened on the base 31 or on the upper face 543 of the pedestal 541.

FIGS. 4 to 6 show three examples for a wave shape 61 that can be achieved by a different arrangement of a plurality of guide profiles 54, 55, 56 instead of a single continuous guide profile 55. In this case, the wave shape 61 in each case schematically reproduces the crest of the emerging wave 60, in a plan view.

In FIG. 4, all three guide profiles 54, 55, 56 are mutually parallel on a line, the gaps between the guide profiles 54, 55 and 56 being as narrow as possible, in reality. The forming wave crest accordingly forms in the wave pool 30 perpendicularly to the flow direction or to the side walls 33.

In FIG. 5, the central guide profile 55 is slightly further from the lower end 52 of the ramp 50 than the two outer guide profiles 54 and 56. As a result, the wave 60 of wave shape 61 assumes the curved wave shape 61', comprising a bulge in the flow direction, in the central region. When surfing on a wave of this kind, in each case a relative acceleration occurs when moving towards the middle, and a relative deceleration when moving from the middle towards the outside.

In FIG. 6 all three guide profile 54, 55, 56 are mutually parallel on a line that is at an angle obliquely to the flow direction or to the side walls 33. During surfing, the wave shape 61" that follows this slant brings about a relative acceleration when traveling in the direction of the right-hand guide profile 54, and a relative deceleration when traveling in the opposite direction.

The examples shown represent only a small selection of the wave shapes 61 that it is possible to create. It is also possible for there to be more or fewer than the three guide profiles 54, 55, 56 shown, such that when said profiles are arranged so as to be straight in part and/or oblique in part and/or mutually offset in part, a plurality of wave shapes 61 is possible, beyond the example shown.

The width of the guide profiles 54, 55, 56 can optionally be telescopically adjustable. This can be achieved in a simple manner by means of an at least partially double-walled design, guide means for a relative displacement of the other wall part being provided on at least one of the wall parts. According to a simple variant, one single continuous guide profile 55 can also extend, in an arcuate arrangement, transversely over the entire wave pool 30.

Instead of the guide profiles 54, 55, 56, or in addition thereto, nozzles 71 can also be used as guide devices in order to promote the formation of a standing wave 60, which nozzles are preferably pivotably arranged either on the guide profiles 54, 55, 56 or, as shown in FIG. 7, on nozzle strips 70 that are arranged on the base 31 of the wave pool 30 or alternatively on the pedestal 541. The nozzles 71 are fed by one or more pumps 72, the capacity of which is preferably controllable and which suction water out of the wave pool 30 or out of the main pool 20 and deliver it to the nozzles 71 at a high pressure that can be varied by means of the pump capacity. The water jet emerging from the nozzles, which jet comprises a perpendicular component with respect to the main flow in the wave pool 30, promotes the formation of the wave 60 in a manner similar to the guide profiles 54, 55, 56. The nozzle strips 70 can accordingly be arranged not only, as shown in FIG. 7, on a line transversely to the main flow in the wave pool 30, but instead can also assume the arrangements, or hybrids thereof, shown in FIGS. 5 and 6. As a result of the pivotable arrangement of the nozzles 71 or the nozzle strips 70 relative to the base 31 of the wave pool, said nozzles or nozzle strips can not only be directed perpendicularly upwards, but instead can also be oriented at any desired angle relative to the main direction, either counter thereto or in the direction thereof.

In the idle state of the surfing installation 10 according to FIG. 1, a total amount of water fills the main pool 20 and also the wave pool 30 located therein, according to the height of the lowest open flap 361, 362, 363 or 364 of the device for drainage regulation 36. During operation of the surfing installation 10 according to FIG. 2, the pumps 45 start up and deliver water very quickly from the main pool 20, via the outlet opening 47, onto the flow portion 46. From there, the water flows into the flow channel 504, accelerated by the narrowing due to the walls 462. In the flow channel 504, the water is restricted and guided in accordance with the position and orientation of the walls 506, 508 in each case. Subsequently, the water is directed in the equalizer 90 and enriched with oxygen. From there, the water flows onto the ramp 50 and, with increasing speed, down to the lower end 52 of the ramp 50. At the lower end 52, said fast-flowing water meets the water in the wave pool 30 that is calmer or more slowly flowing with respect thereto. The water flowing down the ramp 50 is forced back and formed upwards into a standing wave 60 by the sluggish mass of the almost standing or more slowly flowing water in the wave pool 30, which wave becomes established in the wave pool 30 as a stationary state and thus forms a laterally traveling surfable wave as a result of the continuous or discontinuous traveling movement of the flow channel 504.

In this case, the formation of the standing wave 60 is assisted by the guide profiles 54, 55, 56 which function as wave formers. From the wave pool 30, the water flows back into the main pool 20, via the device for drainage regulation 36, and is suctioned again, in said main pool, on the opposing end face of the main pool 20, by the pumps 45. The rear wall 34 of the wave pool 30 that accommodates the device for drainage regulation is preferably designed so as to rise obliquely in the flow direction.

In the simplest case, the mass of water present in the wave pool 30 or in a natural body of water arranged under the ramp 50 spreads out dynamically as a result of the operation of the pumps 45, such that a physically defined overflow edge to the main pool 20 is not required. In the idle state of the pumps 45 according to FIG. 1, the level of the water in the wave pool 30 corresponds to the level of the water in the main pool 20. As soon as the pumps 45 suction water out of the main pool 20 and into the wave pool 30, via the flow portion 46 and the ramps 50, the level of the water in the main pool 20 drops below the level of the water in the wave pool 30, such a defined overflow into the main pool 20 occurs in each case. The water is delivered from the main pool 20 into the wave pool 30 in a closed circuit, by means of the pumps 45, from which wave pool said water flows back into the main pool 20.

The invention can be implemented on a mobile installation which has for example approximately the following dimensions and values, all said values being merely by way of example and in no way limiting: The main pool 20 is approximately 25 to 30 m long and approximately 20 m wide. In the idle state of the approximately ten pumps 45, the water height in the main pool 20 is approximately 1.80 m. The wave pool 30 is approximately 25 m long and approximately 6 to 20 m wide. The base 31 of the wave pool 30 is approximately 1.20 m above the base of the main pool 20. Therefore, in the idle state, the water height in the wave pool 30 is approximately 0.60 m. During operation, the water height H1 on the flow portion 46 is approximately 1 m, and in the wave pool 30 it is approximately 0.40 to 0.50 m downstream of the wave 60, and approximately 0.80 m upstream of the wave 60. The flow channel 504 has a width of approximately 6 to 10 m after the narrowing of the flow portion 46. The later thickness of the water flowing down in the ramp 50 is approximately between 0.50 m and 1.20 m, depending on the set delivery rate of the pumps 45. The flow speed of the water at the lower end of the ramp 50 is up to 6 m/s. In accordance with the increasing speed of the water when flowing down the ramp 50, the layer thickness of said water decreases towards the bottom. In this case, the standing wave 60 reaches a height of up to approximately 1.5 m (measured from the base 31 of the wave pool 30).

It is advantageous for the mobility of the surfing installation 10 if at least parts thereof, such as the pumping units 41, are formed of containers of standard dimensions, a plurality of which are optionally interconnected by means of interposed seals.

The pumping system 40 has an overall height of approximately 2.80 m. The ten pumping units 41 have a width of approximately 2 m in each case. Each pump 45 delivers approximately 2 m³ water per second. The width of the flow portion 46 tapers, between the entry from the pumping units 41 to the entry into the flow channel 504, from 20 m to approximately 6.5 to 10 m. The length of the flow portion 46 from the water inlet 47, including the flow channel 504 and the equalizer 90, to the upper end 51 of the ramp 50 is approximately 10 to 13 m.

The ramp is of a length of approximately 4 to 5 m. The height difference between the upper end 51 and the lower end 52 of the ramp 50 is approximately 0.50 m.

The space in the wave pool 30 in which the standing wave 60 forms adjoins the lower end 52 of the ramp 50. Said space has a length of approximately 2 m upstream of the guide profiles 54, 55, 56, and a length of approximately 3 to 4 m downstream thereof. The rear wall 34 which rises obliquely to the rear and in which the device for drainage regulation 36 between the wave pool 30 and main pool 20 is arranged adjoins said space, over a length of approximately 3 to 4 m. The guide profiles 54, 55, 56 themselves are of a length of approximately 25 cm.

FIGS. 8 to 13 show various embodiments of a surfing installation 10 according to the invention. In contrast with the surfing installation described above, comprising a rectangular wave pool, the surfing installations according to FIGS. 8 to 11 comprise wave pools 30 that correspond to a circular sector that may comprise a central angle of 10°, up to a full circle of 360°.

Figure 8:
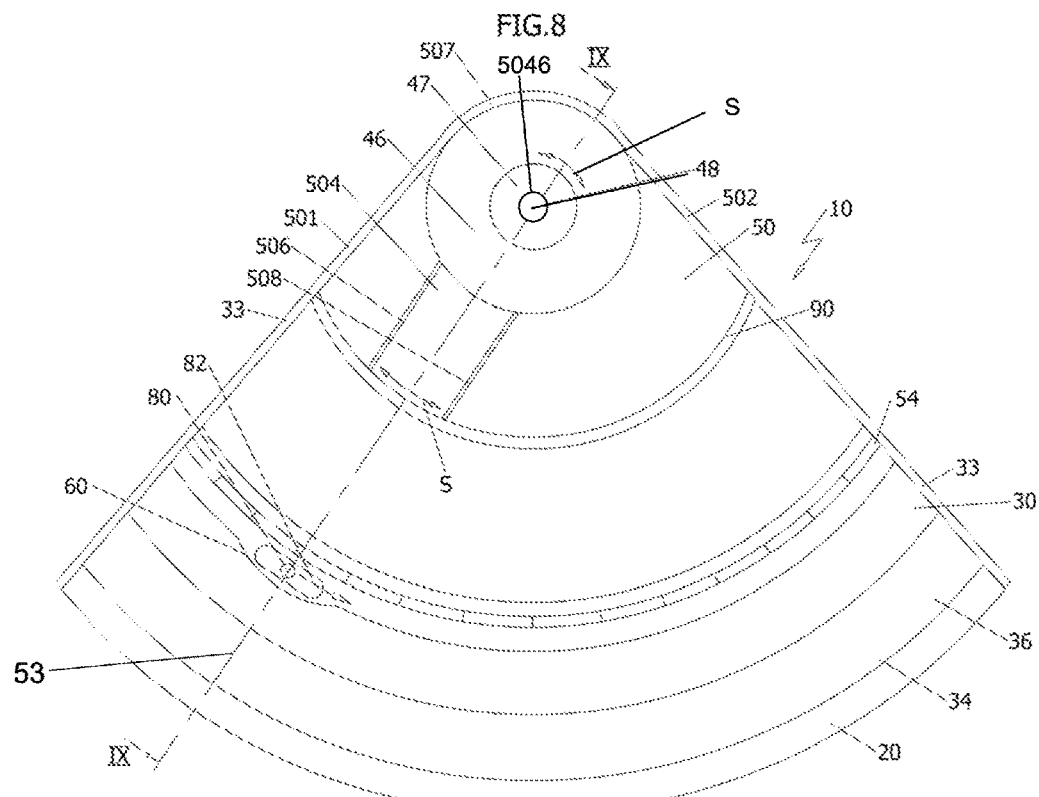
FIG. 8 is a plan view of a surfing installation according to the invention, in which the wave pool corresponds to a circular sector having a central angle of approximately 90°.

In the case of the surfing installation 10 in FIG. 8, said central angle is almost 90°. FIGS. 10 and 11 show two surfing installations 10A and 10B, the wave pools 30 of which form a full circle in each case.

The surfing installation 10 or 10A and 10B is arranged completely in a main pool 20 which completely surrounds the wave pool 30 and the shape of which is preferably adjusted to the wave pool 30. The main pool 20 has a radius that is approximately the same size as that of the wave pool 30.

The wave pool 30 is separated from the main pool 20 by a device for drainage regulation 36 that can adjust the water level in the wave pool 30 using adjustment mechanics 37, and can preferably additionally adjust the outflow speed of said water to the main pool 20 and a return flow 62 towards the floater 54, 55, 56 to a different level, by means of adjustable flaps 361, 362, 363, 364 or openings below the water line, as a result of which the height and shape of the forming wave 60 can be influenced.

The water flowing over the device for drainage regulation 36 is received by the main pool 20 and returned to a pumping system 40 below and/or to the side of the wave pool 30. The pumping system 40 preferably comprises a plurality of pumping units 41, the pumps 45 of which can be connected and shut off individually or in groups. As a result, the amount of water delivered by the pumping system 40 can be varied over a large range.

Figure 9:
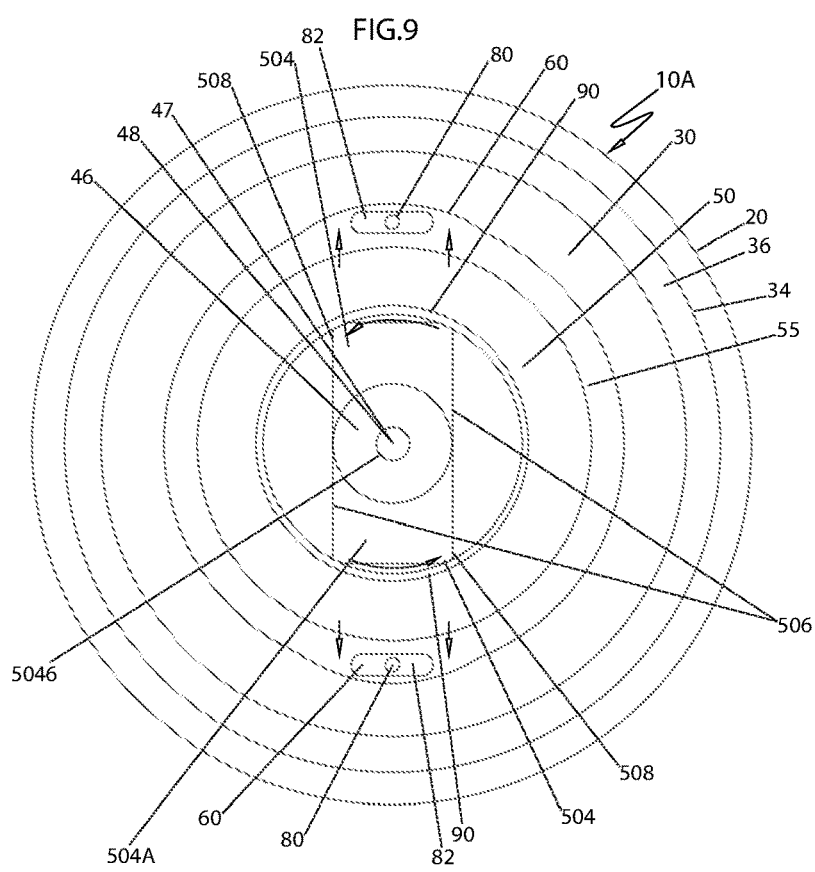
FIG. 9 is a plan view of a surfing installation according to the invention, in which the wave pool corresponds to a complete circle comprising two pairs of movable walls that are mutually offset by 180° and define two flow channels.

In the case of a surfing installation that is circular or in the shape of a circular segment, according to FIGS. 8 to 10, the pumping system 40 delivers the water to a water inlet 47 that is arranged centrally in the region of the center of the circle or of the circular sector. From there, the water flows over a flow portion 46 which is horizontal or which descends slightly in the flow direction, and which serves to homogenize the current of water. The at least one flow channel 504 that can be moved in an oscillating or rotational manner is also arranged on the flow portion 46. The flow channels 504 are each delimited by two side walls 506 and 508. The lower faces of the walls 506, 508 adjoin the upper face of the flow portion 46 in a sealed manner. The seal can be achieved for example by means of a rubber strip that is in contact with the upper face of the flow portion 46 and slides on the flow channel in the event of a movement thereof.

A ramp 50 that descends towards the outside adjoins the flow portion 46, which ramp is of a frustoconical shape or of a shape corresponding to a sector of a frustum, owing to the circular or circular sector-shaped design of the surfing installation 10.

The lower end 52 of the ramp 50 leads into the wave pool 30. Guide devices in the form of one or more guide profiles 55 and/or in the form of the nozzle strips 70 shown in FIG. 7 are arranged at a spacing from the lower end 52 of the ramp 50, on a path concentric to the center 48 or on a path extending in a more shallow curve or on a straight or polygonal path. In this case, the guide profiles 55 and/or the nozzle strips 70 are preferably adjusted to the contour of the path.

The walls 506, 508 are preferably connected to a support structure or a pivot device which is mounted on a fixed or movable bearing so as to be rotatable about at least one axis of rotation 5048. The rotation is achieved by means of at least one drive 5046 that is preferably arranged in the region of the axis of rotation 5048. As shown in FIGS. 3 and 3A, the walls 506 and 508 that define the flow channel 504 can also be pivoted by two separate drives 5046 that are preferably actuated synchronously. In the embodiment according to FIG. 8, the walls 506 and 508 can be connected, at the rear end thereof, to a further, semicircular wall 507 which surrounds the water inlet 47 and ensures that the delivered water flows mainly into the flow channel 504. The walls (506, 508) defining the flow channel (504) are connected to at least one drive (5046) by a link (5042).

In the embodiment according to FIG. 8, the flow channel 504 is moved back and forth in an oscillating manner, about the axis of rotation 5048, by means of the drive 5046, as shown by the double arrow S. As a result of the narrow channeling of the downward flowing water, in the region of the flow channel 504, when said water strikes the standing or more slowly flowing water in the wave pool 30, a standing wave 60 forms in each case only in a portion of under the flow channel 504, which wave travels back and forth together with the pivoting movement of the flow channel 504.

A surfer 80 (shown schematically) can thus surf, using his surfboard 82, on the further traveling wave 60, along a circular path on a larger distance, transversely through the wave pool 30. In this case, in the embodiment according to FIG. 8, said surfer turns shortly before reaching a side wall 33 of the wave pool 30, and then continues to follow the wave 60 travelling back, which wave is moved in the counter direction by means of the flow channel 504 that pivots back.

FIG. 9 shows a surfing installation 10A, in which the wave pool 30 and the surrounding main pool 20 correspond to a full circle. Accordingly, the ramp 50 is also formed as a frustoconical full circle. In the case of the surfing installation 10A, two flow channels 504 are provided that are arranged so as to be mutually opposing by 180°. As a result, two standing waves 60 are formed simultaneously, opposite one another, in the wave pool 30, and are set into a traveling sideward movement by means of a rotation of the flow channels 504. As a result, two surfers 80 can surf on the surfing installation 10A simultaneously.

In contrast to the surfing installation 10A, in the case of the surfing installation 10B shown in FIG. 10 three flow channels 504 are arranged so as to be mutually offset by 120° in each case. As a result, in the event of a rotation of the flow channels 504 three traveling standing waves 60 are generated simultaneously, which waves can be used by three surfers 80.

Depending on the size of the installation, it is also possible that more than three flow channels 504, for example four or more flow channels 504, may be provided.

The surfing installation according to the invention that is shown in FIGS. 8 to 10 allows a surfer 80 or several surfers 80 an entirely new surfing experience, in which a wave 60 can be travelled over a larger distance.

However, as already shown in connection with FIGS. 1 to 3A, the surfing installation 10 according to the invention can also be achieved in conjunction with a rectangular wave pool 30. In the region of the flow portion 46, further acceleration of the flow speed takes place over limiting walls 462 that taper towards one another, in a funnel-shaped manner, in the flow direction. The walls 506 and 508 that are arranged above the ramp 50 and that define the flow channel 504 are arranged so as to be displaceable transversely to the flow direction, pivotable transversely to the flow direction, or so as to be displaceable and pivotable in combination (translationally and/or rotationally). As a result, the flow of water that is directed into the wave pool 30 via the ramp 50, by means of the flow channel 504 that is movable transversely to the flow direction, brings about the formation of a changing wave 60 that travels back and forth, in the region of the guide profiles (floaters) 54, 55, 56.

FIG. 11 shows a variant of a surfing installation according to the invention that is installed in a natural river course. In this case, the installation preferably takes place in the region of a weir that forms a natural ramp 50 owing to the riverbed that falls away in the base region. A flow portion 46 that is located above the weir, i.e. the ramp 50, is narrowed in a funnel-shaped manner, in the flow direction, by means of two side walls 461, before transitioning into a flow channel 504 that is delimited by a first wall 506 and a second wall 508 that is spaced apart therefrom.

The walls 506 and 508 are pivotable, in accordance with the arrow S, by means of a drive 5046, into a position 506A and 508A, respectively, indicated by dashed lines, in which position the flow channel 504A is positioned obliquely to the flow direction, in the flow portion 46. In this case, the pivoting movement of the flow channel 504A takes place continuously or discontinuously. In this case, the pivoting movement can preferably be achieved by a controller, comprising at least one adjustable parameter or at least one program, by means of corresponding actuation of the drives 5046. This also applies for all the other embodiments in the remaining figures.

A translational displacement of the flow channel 504 according to the arrow V is also possible, as an alternative to or in a manner superimposed on the pivoting according to the arrow S.

The narrowing of the flow portion 46 by means of the funnel-shaped walls 461 brings about an acceleration of the flow of water, which acceleration is further increased, in the weir region, by the falling ramp 50. The back and forth movement of the flow channel 504, by means of pivoting and/or displacement, generates a standing wave 60, which travels back and forth and which can be traveled by a surfer 80 using his surfboard 82, under the ramp 50, in a region 30 of more slowly flowing water which in this case replaces the wave pool 30 of the other embodiments.

According to an alternative embodiment, the device comprising the walls 461 and the walls 506 and 508, can be moved by means of a drive, for example by means of a revolving Bowden cable that is braced above the river course. In the case of this surfing installation which is arranged in a flowing body of water, in contrast to the situation in the case of an artificial surfing installation 10 the energy requirement for the operation of the pumping system 40 is dispensed with entirely.

A further option for an advantageous embodiment of the surfing installation according to the invention consists in the movement speed of the flow channel 504 being variable. This can also be achieved automatically for example, by means of a camera (not shown) observing the surfer 80, a controller evaluating the speed on the basis of the position change thereof, and outputting a corresponding signal to the drive 5046 for pivoting and/or translational displacement of the flow channel 504.

Instead of just one flow channel 504, other embodiments are also possible in which a plurality of flow channels 504 are arranged side-by-side. If said flow channels are charged with partial currents of water of different strengths, a particular shaping of the wave 60 over the width thereof is additionally possible.

FIG. 12 shows an alternative particularly preferred embodiment of the invention. In contrast with FIGS. 4 to 7, in this case a continuous guide profile 55, also referred to as a floater 55, is arranged in the wave pool 30. The side view of said floater 55 is shown in FIG. 12. In this case, the floater 54 is not provided on the base 31 of the wave pool 30, but instead on a pedestal 541 arranged on the base 31.

The pedestal 541 comprises a front flank 542 that is shaped so as to rise in a manner favorable to the flow, a substantially horizontal, plateau-like upper face 543, and a flank 544 that falls away to the rear. In this case, the pivot bearing 57 of the floater 54 is arranged on the upper edge of the front flank 542 or in the front region of the upper face 543. The adjustment mechanics 58, designed by way of example as a pneumatic cylinder, can preferably be arranged so as to be sunk into the pedestal 541 at least in part. The fold-out angle A of the floater 54, and thus the shape and the height of the wave 60, can be changed using the adjustment mechanics 58. The arrangement of the floater 54 shown in FIG. 12, on a pedestal 541, can also be used for the floaters 54, 55, 56 and also for the nozzle strips 70 shown in the other figures. In an advantageous variant, the pedestal 541, together with the floaters 54, 55, 56 or the nozzle strips 70, can be sunk completely into the base 31 of the wave pool 30, such that the wave pool 30 can also be used as a swimming pool having a completely flat base.

FIG. 13 is a cross-sectional view of an equalizer 90 according to a first embodiment, in which a plurality of tubular hollow bodies 94 are provided within a surrounding frame 92, in a manner packed so as to rest close together and so as to have parallel longitudinal axes 95, through which hollow bodies the water flowing down the ramp 50 is once again oriented so as to be in a flow direction extending in parallel with the fall line 53 of the ramp 50 (see FIG. 3A and 8), following deflection by means of the translationally and/or rotatably movable walls 506 and 508. As a result of the water flowing down perpendicularly striking the stationary or more slowly flowing water, the formation of the standing wave 60 is positively influenced.

FIG. 13A is a cross-sectional view of an alternative embodiment of an equalizer 90. In this case, the water is divided, by means of a plurality of partition walls 96 arranged in parallel in the frame 92, into individual channels 97 which are preferably of the same size and which, just like the hollow bodies 94 in FIG. 13, are used for orienting the water in parallel with the longitudinal axis 95 in FIG. 3A and 8. The partition walls 96, which are preferably formed by separating plates, can also be divided into further channels 97 having preferably rectangular or square cross sections, by means of further partition walls (not shown in FIG. 13A) that are not arranged in parallel therewith, in particular are arranged so as to be perpendicular thereto.

The equalizer 90 preferably is of an overall height, from the base of the ramp 50, of approximately 1 m. In this case, the partition walls 96 are preferably at a spacing of approximately 10 cm to 20 cm.

Figure 14:
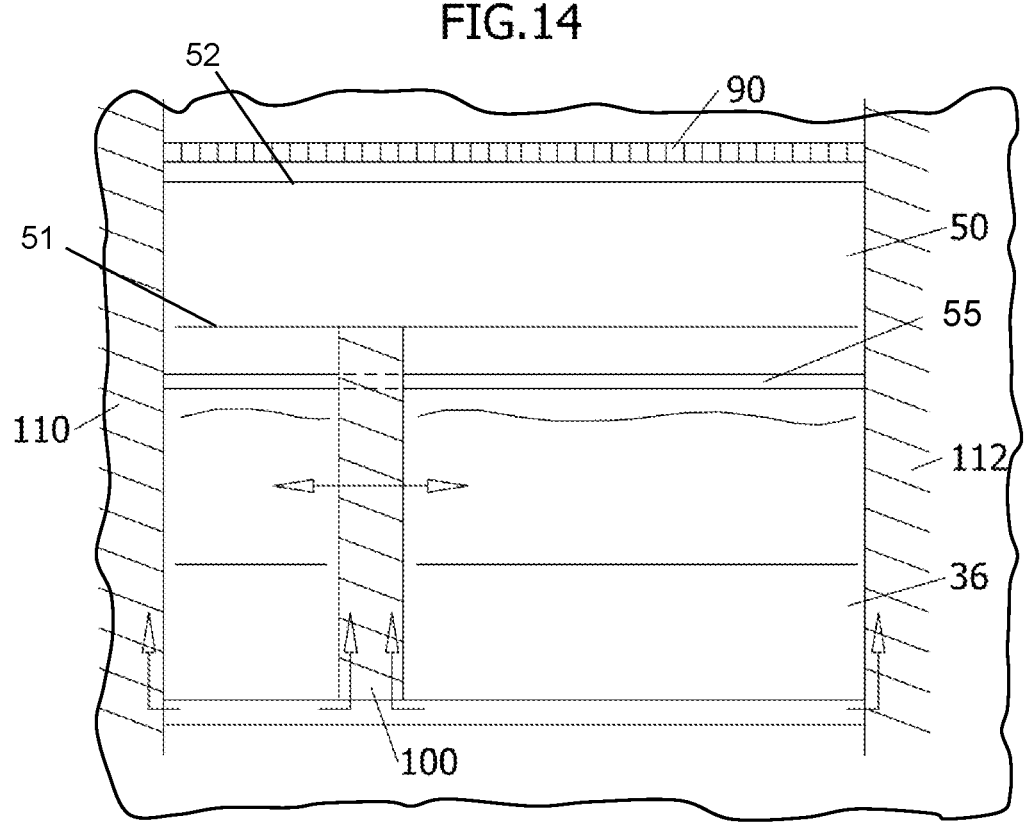
FIG. 14 shows a wave pool that is additionally also divided into two portions by means of a flow divider.
Figure 14A:
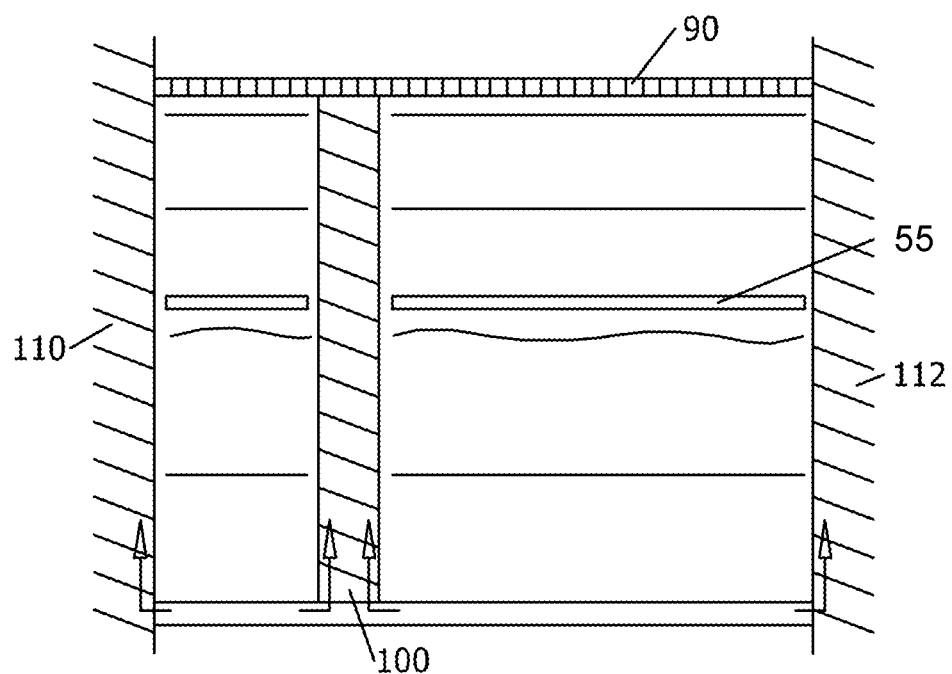
FIG. 14A shows an alternative to FIG. 14, in which the flow divider additionally also extends into the region of the ramp.
Figure 15:
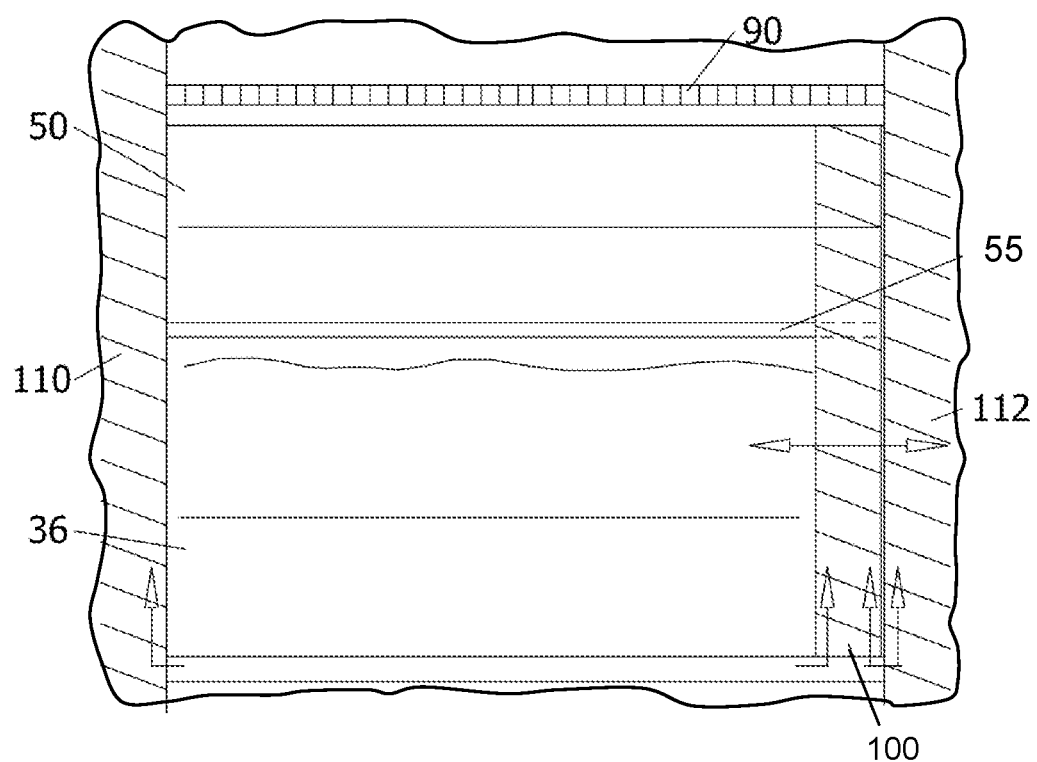
FIG. 15 shows an alternative position to FIG. 14, in which the flow divider rests on a side wall.

FIG. 14, 14A and 15 show a further advantageous feature of the surfing installation 10 according to the invention. In this case, in FIG. 14 at least one flow divider 100, also referred to as a divider 100, which is mounted so as to be displaceable transversely to the wave pool 30, i.e. perpendicularly to the main flow of the water, is arranged in the wave pool 30, below the ramp 50. The wave pool 30 is divided into different portions by means of the displaceably mounted flow divider 100. The wave pool 30 can thus be adjusted to different requirements with respect to the number and the performance level of the surfers. Thus, for example in the case of a relatively low requirement (for example if only a few beginner level surfers wish to surf), it is possible for a wave 60 traveling back and forth to be supplied only to the part of the wave pool 30 to the left of the flow divider 100 in FIG. 14, from the flow channel 504 (not shown here) located above the equalizer 90. In this case, the amount of water delivered by the pumps 45 can be significantly reduced, and thus a significant amount of energy can be saved by throttling the pump or by shutting off a series of pumps 45. If the number or the demands of the potential users of the surfing installation 10 increase, the region of the wave pool 30 used can be increased again as desired, by displacing the flow divider 100, or a wave 60 traveling back and forth can act on the larger region of the flow channel 504, located to the right of the flow divider 100 in FIG. 14. If the full width of the wave pool 30 is intended to be used, as shown in FIG. 15 the at least one flow divider is moved to a side wall of the wave pool 30 or alternatively also completely removed from the wave pool 30.

In the variant shown in FIG. 14A, the flow divider 100 also extends into a region of the ramp 50, in a shape bent upwards in the region of the lower end 52 of the ramp 50, in accordance with the gradient of the ramp 50.

The at least one flow divider 100 comprises a recess in the lower region thereof, at the height of the guide profile 55, such that said flow divider can be moved laterally beyond the guide profile 55.

As is can be seen from FIG. 14, 14A and 15, the region to the right and left of the wave pool 30 and beyond the rear wall 34 of the wave pool 30 can be accessed by walkways 110, 112, 114. The walkways 110, 112, 114 can be secured by railings (not shown) and reached by steps or ladders on the end face or to the side of the main pool 20. However, it is also possible for the entire surfing installation 10 to be set into the base, either in part or completely, such that the walkways 110, 112, 114 can then be reached at ground level or can be omitted.

It is optionally possible, according to a further embodiment of the invention, for the walls 506 and 508, or 506A and 508A, which define the at least one flow channel 504, 504A and 504B, to be designed such that they can be raised. The preferably motorized raising of the walls 506 and 508, or 506A and 508A, makes it possible for water to briefly flow over the entire width of the ramp 50 again, as far as the lower end 52 thereof.

LIST OF REFERENCE SIGNS 10 surfing installation
10A surfing installation (FIG. 11)
20 main pool
30 wave pool (or slower flow region)
31 base (of 30)
32 support
33 side wall (of 30)
34 rear wall
35 front wall
36 device for drainage regulation (of 30 into 20)
361 flap
362 flap
363 flap
364 flap
37 adjustment mechanics (for 36)
40 pumping system
41 pumping unit
45 pump
46 water inlet (flow portion)
462 side wall (of 46)
47 water inlet (outlet opening of 40 into 46)
48 center
50 ramp
501 side wall (of 50)
504 flow channel
504A flow channel 504B flow channel
5042 link
5046 drive
5048 axis of rotation
506 wall
506A wall
508 wall
508A wall
51 upper end (of 50)
52 lower end (of 50)
53 fall line (of 50)
54 guide profile (floater)
541 pedestal
542 (front) flank (rising)
543 upper face
544 (rear) flank (falling)
55 guide profile (floater)
56 guide prodile (floater)
57 pivot bearing
58 adjustment mechanics (for 54-56)
96 partition wall (in 90)
97 channel
100 flow divider (divider)
110 (lateral) walkaway
112 (lateral) walkaway
114 (rear) walkaway
H1 water height (in 46 during operation)
A pivot angle (of 55)
S pivot direction (arrow)
V displacement direction (arrow)
60 wave
61 wave shape
62 return current eddy
70 nozzle strip
71 nozzle
72 pump
80 surfer
82 surfboard
90 equalizer
92 frame (of 90)
94 hollow body (tube)
95 longitudinal axis (of 94; 96, in parallel with fall line 53)

The invention claimed is:

1. Surfing installation (10, 10A, 10B) for generating a surfable wave (60), comprising an inclined ramp (50) to an upper end (51) of which water flows via a water inlet (46), which water is accelerated on the ramp (50) to a first flow speed, a lower end (52) of the ramp (50) leading into a wave pool (30) or into a region (30) having a lower second flow speed relative to the first flow speed, and a standing wave (60), in the flow direction, forming in the region (30) as a result of the water flowing at the first, faster flow speed striking the water flowing at the second, lower flow speed, characterized in that at least two walls (506, 508) that define at least one flow channel (504) are arranged in the region of the water inlet (46) and/or of the ramp (50), said at least two walls (506, 508) are movable in rotation and/or in translation, transversely to the flow direction of the water, by means of at least one drive (5046) in order to generate at least one traveling wave (60) that travels transversely to the flow direction, wherein a proximal end of each of the at least two walls (506, 508) of the flow channel (504) is coupled to the at least one drive (5046), which causes a free distal end of each of the at least two walls (506, 508) to pivotally move back and forth continuously or in adjustable intervals, or to move in a synchronous and rotational manner.

2. Surfing installation according to claim 1, characterized in that the water inlet (46) and the ramp (50) are part of a circulating system in which the lower end (52) of the ramp (50) leads into the wave pool (30) that forms the region (30) having the lower second flow speed, from which the water is delivered again to the water inlet (46), via at least one pumping system (40).

3. Surfing installation according to claim 2, characterized in that the wave pool (30) is surrounded by a main pool (20) or by a standing or flowing body of water.

4. Surfing installation according to claim 2, characterized in that the wave pool (30) is formed in the shape of a rectangle or in the shape of a circular sector having an inscribed angle of from 10° to 360°.

5. Surfing installation according to claim 4, characterized in that the water inlet (46) is arranged in the region of the center (48) of the circular sector.

6. Surfing installation according to claim 1, characterized in that the walls (506, 508) defining the flow channel (504) are connected to the at least one drive (5046) by a link (5042), or are guided in parallel, by a plurality of synchronously actuatable drives (5046) that are each assigned to one wall (506, 508), respectively, during a pivoting movement and/or displacement movement of the flow channel (504).

7. Surfing installation according to claim 6, characterized in that the movement of the walls (506, 508) defining the flow channel (504) is performed as an alternating back and forth pivoting movement or as a displacement movement, or as a rotational movement in one direction.

8. Surfing installation according to claim 2, characterized in that the pumping system (40) for metering the discharge of the water in the water inlet (46) comprises a plurality of pumping units (41), a delivery rate of said pumping units being adjustable individually or in groups.

9. Surfing installation according to claim 1, characterized in that the walls (506, 508) defining a flow channel (504) are mounted such that they are vertically adjustable in order to change the width of the flow channel (504).

10. Surfing installation according to claim 1, characterized in that at least one guide device (54, 55, 56; 70, 71) is arranged in the wave pool (30) so as to be at a spacing from a lower end (52) of the ramp (50).

11. Surfing installation according to claim 10, characterized in that the guide device (54, 55, 56; 70, 71) is designed as a fixed assembly, or as an assembly that is adjustable with respect to the position and orientation thereof, or as an assembly that is completely sunk in the base (31) of the wave pool (30), said component being formed on a pedestal (541) that is raised from the base (31) of the wave pool (30).

12. Surfing installation according to claim 10, characterized in that the guide device (54, 55, 56; 70, 71) comprises at least one guide profile (54, 55, 56) that is pivotable about a pivot bearing (57), and/or at least one nozzle strip (70) comprising at least one nozzle (71) and at least one pump (72).

13. Surfing installation according to claim 1, characterized in that an equalizer (90) is arranged upstream of the ramp (50) in the flow direction, which equalizer comprises a plurality of hollow bodies (94) or channels (97) formed by partition walls (96), the longitudinal axes (95) of which are arranged so as to be perpendicular to an upper end (51) of the ramp (50) or in parallel with the fall line (53) thereof.

14. Surfing installation according to claim 1, characterized in that at least one flow divider (100) that is displaceable transversely to the flow direction is arranged in the wave pool (30) and/or in the region of a ramp (50).

15. Surfing installation according to claim 1, characterized in that the water level and/or the lower second flow speed in the flow direction behind the wave (60) is regulated by at least one device for drainage regulation (36) that is adjustable by adjustment mechanics (37).

\* \* \* \* \*